Dec. 21, 1926.
C. B. FRANKLIN
BATTERY BOX OR CONTAINER
Filed Nov. 12, 1924
1,611,519
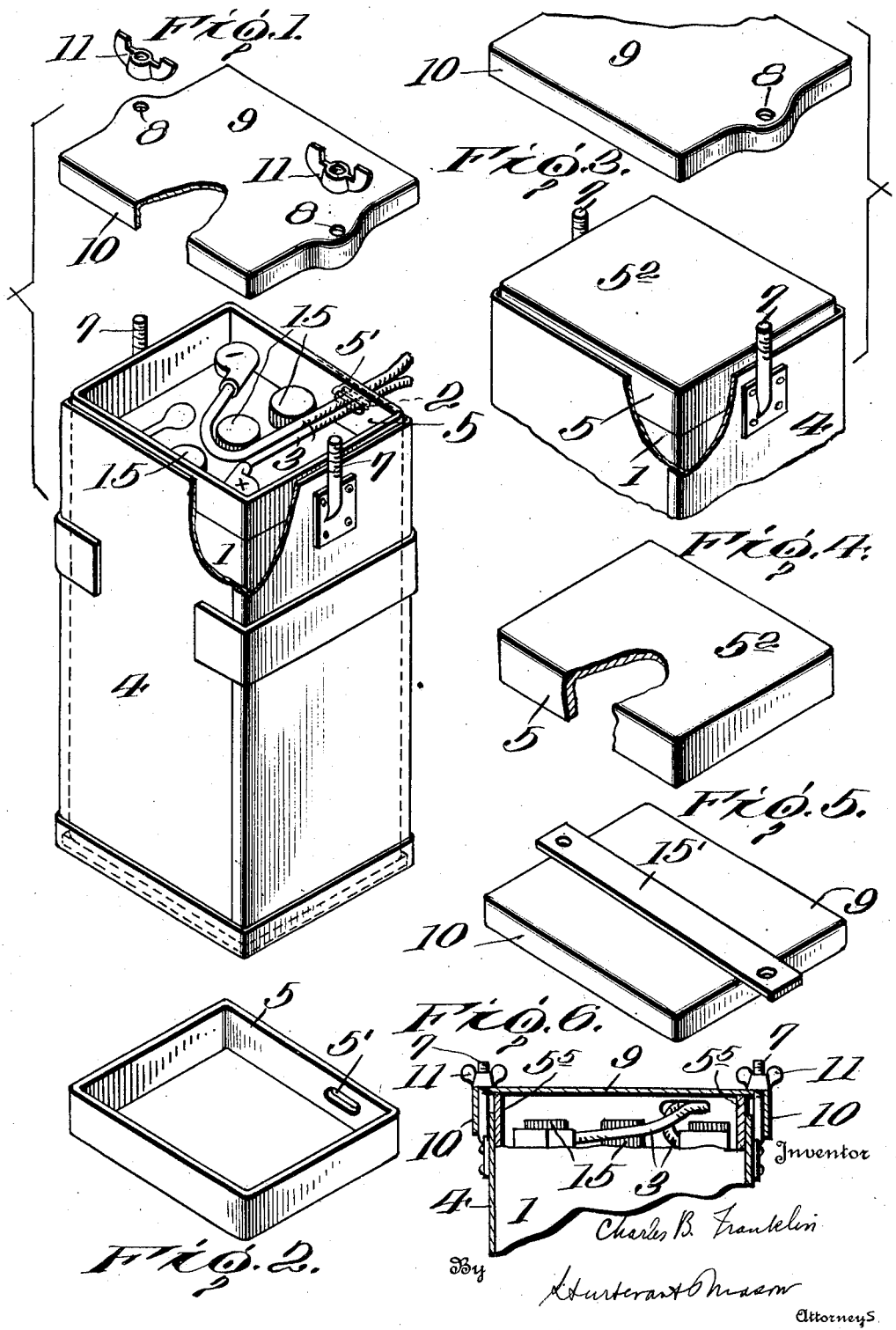

Patented Dec. 21, 1926.

1,611,519

UNITED STATES PATENT OFFICE.

CHARLES B. FRANKLIN, OF SPRINGFIELD, MASSACHUSETTS, ASSIGNOR TO INDIAN MOTOCYCLE COMPANY, OF SPRINGFIELD, MASSACHUSETTS, A CORPORATION OF MASSACHUSETTS.

BATTERY BOX OR CONTAINER.

Application filed November 12, 1924. Serial No. 749,498.

My invention relates to battery boxes or containers such as are employed in holding secondary batteries for use in motor vehicles of various kinds. These batteries are subjected to vibrations and sudden jolts which cause them to be moved about in the container or box, thus causing disagreeable noises, chafing of the battery wires and injury to the battery itself and to the box or container.

The object of the invention is to provide means for firmly securing the battery against movement in its box or container by means of a clamping band located between the upper edge of the battery shell and the lower side of an adjustable clamping means such as a cover or crossbar carried by the upper end of the battery box and adapted to force the clamping band and battery downwardly and so hold the battery against movement.

This object I attain by the construction shown in the accompanying drawing, in which:

Fig. 1 is a perspective of my improved battery box or container with the battery and clamping band in place and the lid or cover removed.

Fig. 2 is a perspective of the clamping band.

Fig. 3 is a perspective of a battery box, its inclosed battery and a modified form of clamping band; the box cover being removed and one corner of the box being broken away.

Fig. 4 is a perspective of the clamping band of Fig. 3 partly broken away.

Fig. 5 is a perspective of a clamping bar to be used in lieu of the cover of Fig. 3.

Fig. 6 is a sectional view of a further modification.

The battery 1 is shown within its box 4 of metal or suitable material; the box being of greater height than the battery so as to permit of the insertion of a clamping band 5 shaped to conform to the contour of the box 4, which in Figs. 1 and 2 is shown as an open rectangle preferably formed of hard rubber or other suitable material capable of receiving pressure and exerting force upon the upper edge of the battery casing and of a thickness to engage such edge only and not press on the top of the battery which is usually not strong enough to sustain such pressure.

The clamping band 5 is of greater height than the space between the upper edge of the battery 1, and the upper edge of battery box 4, so as to project above said upper edge of the battery box. A clamping device is provided to engage the upwardly extending exposed edge of the band 5 and force it down into clamping contact with the battery shell or casing. As shown in Fig. 1, there are two upwardly projecting screw studs 7, 7 secured to opposite sides of the battery box which are adapted to pass through the apertures 8, 8 in a cover 9 of metal or other suitable material; the cover having a depending flange 10 to inclose the upper edge of the box 4.

The under side of the cover 4 rests upon the upper edge of the band 5 so that the nuts 11, 11, when turned down on the screws 7, 7, will force the cover 4 down and the cover will in turn force the band 5 firmly down on the battery and so no movement of the battery relative to the box or container will be possible.

The box 4 is provided near its upper edge with a lateral outlet 2 for the battery connector-wires 3, 3, and the follower 5 is provided with a similar outlet 5' for said wires, registering with the outlet 2.

Where the outlet 5' is a marginally inclosed opening the wires will hold the band 5 in place when the cover 9 is removed.

The battery terminals and filling caps 15 are readily accessible without removing the band 5.

In Fig. 3 the clamping band 5 engages the battery shell or case just as in Fig. 1, but it has a cover portion $5^2$ so that it in fact is a cover with a depending clamping band 5 projecting above the box 4 and adapted to be forced down by the main box cover 9 when the securing nuts are turned down. This cover-shaped clamping band 5, $5^2$ acts as an auxiliary cover and is an additional protection against the entry of water, dust, &c. The cover 4 is the same as that shown in Fig. 3, but a simple crossbar 15' may be employed in lieu thereof, or any other desirable clamping means may be used in forcing down the clamping band and holding it in place.

It is obvious that the outlet 5' for the connector-wires may be an open notch instead of an inclosed opening. These outlets are in the sides of the band 5 and box 4 instead of through the top of the cover and are of a size to closely fit around the wires, thus preventing the entrance of foreign matter therethrough.

Instead of forming the band 5 as a separate element, the outer case or shell of battery 1 could be extended above its top, as at 5⁵, to a point above the upper edge of the battery box 4, as shown in Fig. 6, so as to be engaged by a clamping means as are the bands 5 in Figs. 1 to 4. This form of clamping band will also have an outlet 5' for the connector-wires to register with the outlet in the box 4.

The term "clamping band" is intended to include all such forms of the device upon which the cover or clamping means exerts its downward pressure to cause the battery to be forced down and held firmly in the battery box.

The clamping band may be rectangular or circular, according to the shape of the battery box.

What I claim is:

1. The combination with a battery box of a battery therein, a clamping band extending from and around the upper outer edge of the battery casing or shell to a point above the battery box, and a clamping means engaging the upper edge of the band to force it and the battery down firmly into the said box.

2. The combination with a battery box, of a battery therein, a clamping band extending from the upper outer edge of the battery casing or shell to a point above the battery box, and a clamping means engaging the upper edge of the band to force it and the battery down firmly into the said box, the said clamping band and the battery box having registering lateral outlets for the connector wires.

3. The combination with a battery box, of a clamping band fitting within and around the upper end of said box and of a height to project above its upper edge when in edgewise engagement with the upper edge of a battery shell, a clamping means on the box to exert a downward pressure upon said band and cause it to clamp the battery firmly in the box.

4. The combination with a battery box, of a clamping band fitting within the upper open end of the box and of a height to project above said upper edge when in edgewise engagement with the upper end of a battery shell or case, a cover inclosing the upper end of said battery box and resting on the upper exposed edge of the band, and means for forcing the cover downwardly upon the clamping band.

5. A battery box or container provided with screw studs and nuts at opposite sides of its upper end, a cover apertured for the studs, and a clamping band extending around the inner sides of the open end of the box and projecting above its upper edge; said band adapted at its lower edge to rest upon the upper edge of a battery shell and clamp it in place as the cover is forced down.

6. A battery box or container provided with a cover and means for clamping the cover in place, a clamping band extending around the inner sides of the open end of the box and projecting above its upper edge; the said band adapted at its lower edge to rest upon the upper edge of a battery shell and clamp it in place as the cover is forced down; the band and upper side of the box having lateral registering connector-wire outlets.

7. A battery box or container provided at its upper end with clamping means, and a clamping band fitting within the upper open end of the box and extending thereabove with its lower edge adapted to engage the upper edge of a battery shell and clamp it in the box, said band having a cover portion to close the upper end of the battery box; lateral outlet openings being formed in the sides of the box and band.

8. The combination with a battery box, of a clamping band fitting within the upper open end of said box and adapted to rest edgewise upon and around the upper edge of a battery shell, and a clamping means engaging the upper portion of said band to force it and the battery firmly down into the said box.

9. A battery box provided at its upper open end with a battery-clamping means conforming to the contour of the interior of said box and of a width to engage only the upper edge of the battery shell to thereby relieve the top of the shell and battery elements of all pressure.

In testimony whereof, I affix my signature.

CHARLES B. FRANKLIN.